United States Patent [19]

Ebert et al.

[11] Patent Number: 4,610,443
[45] Date of Patent: Sep. 9, 1986

[54] SUN VISOR AND METHOD FOR THE MANUFACTURE THEREOF

[75] Inventors: Charles Ebert, Luxeuil, France; Lothar Viertel, Saarlouis, Fed. Rep. of Germany

[73] Assignee: Gebr. Happich GmbH, Fed. Rep. of Germany

[21] Appl. No.: 561,049

[22] Filed: Dec. 13, 1983

[51] Int. Cl.⁴ .............................................. B60J 3/02
[52] U.S. Cl. ................................ 296/97 H; 296/97 R
[58] Field of Search .................. 296/97 R, 97 H, 97 J, 296/97 K; 160/DIG. 3

[56] References Cited

U.S. PATENT DOCUMENTS

| 4,070,054 | 1/1978 | Cziptschirsch | 296/97 K |
| 4,469,367 | 9/1984 | Kuttler et al. | 296/97 K |

FOREIGN PATENT DOCUMENTS

| 0057811 | 8/1982 | European Pat. Off. | |
| 68269 | 1/1983 | European Pat. Off. | 296/97 K |
| 1111968 | 11/1958 | Fed. Rep. of Germany | |
| 1914962 | 11/1968 | Fed. Rep. of Germany | |
| 7228578 | 2/1972 | Fed. Rep. of Germany | |
| 7304223 | 5/1973 | Fed. Rep. of Germany | |
| 2443307 | 2/1978 | Fed. Rep. of Germany | |
| 2737215 | 4/1978 | Fed. Rep. of Germany | 296/97 R |
| 8022504 | 8/1980 | Fed. Rep. of Germany | |
| 8015596 | 9/1980 | Fed. Rep. of Germany | |
| 8121406 | 10/1981 | Fed. Rep. of Germany | |
| 2376766 | 9/1978 | France | 296/97 H |
| 1093092 | 11/1967 | United Kingdom | 296/97 K |
| 1452220 | 10/1976 | United Kingdom | |

Primary Examiner—Robert B. Reeves
Assistant Examiner—Russell D. Stormer
Attorney, Agent, or Firm—Ostrolenk, Faber, Gerb & Soffen

[57] ABSTRACT

The body of a sun visor is reinforced with a generally rectangular wire frame. At one corner of the frame is an injection-molded plastic mounting housing molded on the reinforcing frame and that housing receives the mounting shaft for supporting the visor in a vehicle. The wire frame has separated ends which extend past each other and this region of the frame is disposed in an injection molding cavity in which the mounting housing is to be molded. A U-shaped spring is also placed in the injection molding cavity and its side arms extend past the wire frame. A peg in the mounting housing extending through the spring defines the opening in the molded housing past the spring in which the mounting shaft for the visor is received. With the region of the frame and the spring in place in the injection mold for the mounting housing, moldable plastic is injected into the cavity of the mold and the mounting housing is directly molded to the reinforcing frame and the spring.

8 Claims, 4 Drawing Figures

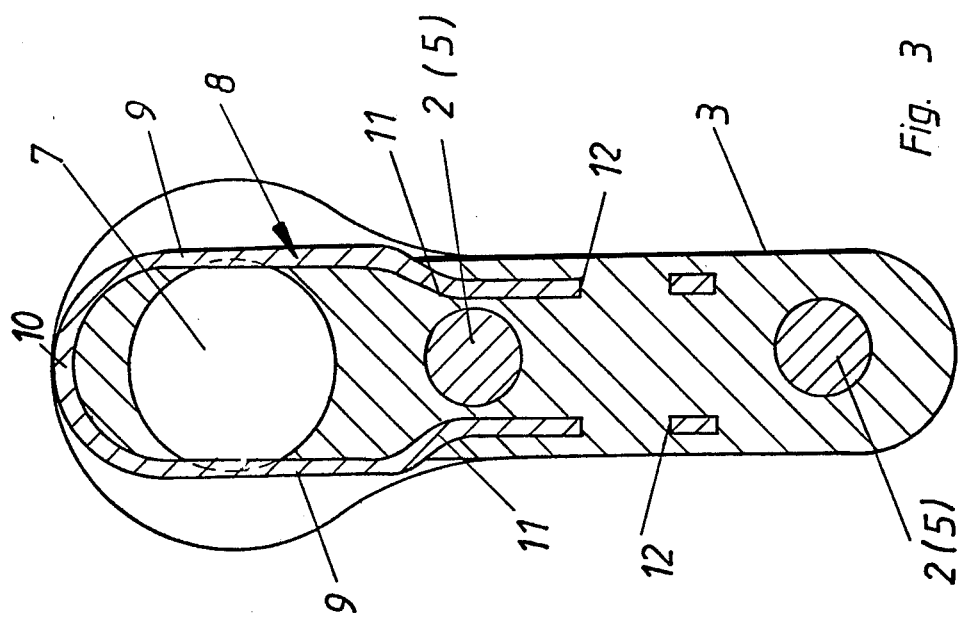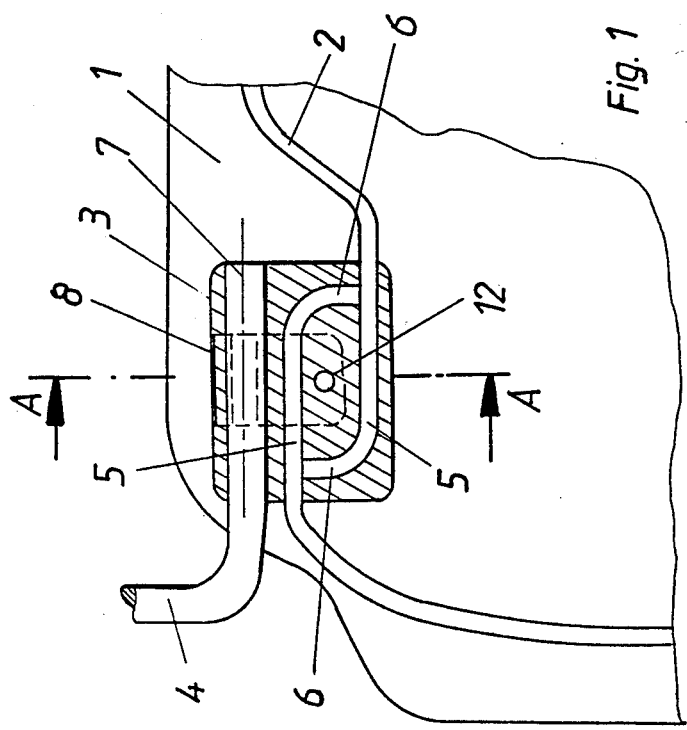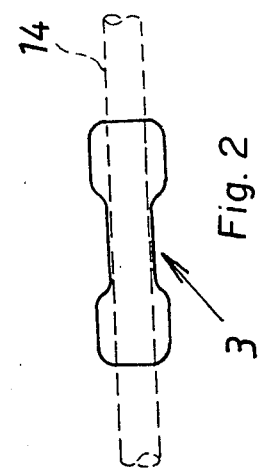

SUN VISOR AND METHOD FOR THE MANUFACTURE THEREOF

BACKGROUND OF THE INVENTION

The invention relates to a sun visor, particularly for automotive vehicles, in which the sun visor body has a reinforcing insert embedded in it. The insert is comprised of a length of wire bent approximately into the shape of a rectangular frame. A mounting housing developed as a plastic injection molding is also embedded in the sun visor body and is connected to a corner region of the insert frame. The mounting housing is for receiving a sun visor supporting shaft in at least the corner region of the insert frame. The invention also relates to a method of manufacturing this sun visor.

Reinforcing inserts for stiffening sun visor bodies customarily are solid plastic frames with mounts developed on them (Federal Republic of Germany Pat. No. 26 33 002, corresponding to U.S. Pat. No. 4,163,579), or wire frames with sheet metal mounts welded or riveted on them (German Provisional Patent DE-AS No. 11 11 968), or wire frames with plastic mounts arranged on them (German Pat. No. 24 43 307). The object of the invention is to improve the last-mentioned type of insert.

The sun visor shown in German Pat. No. 24 43 307 has a reinforcing insert in the form of a wire frame which is encased in the sun visor body. It has a mounting housing, referred to as the holding body, which is also encased in the sun visor body and is developed as a plastic injection molding. The mounting housing into which the sun visor shaft is inserted is connected in a relatively rigid fashion with the wire frame. In order to produce this connection, the mounting housing is developed with at least two frame wire receivers such that the wire can be applied to the mounting housing by a swinging motion.

Although the sun visor of German Pat. No. 24 43 307 has proven excellent in practice, it might be made less expensive to manufacture. While the special development of the mounting housing facilitates the assembly of the wire frame which is to be fixed on the mounting housing, this advantage is counteracted, however, by the rather complicated development of the mounting housing which is required for this.

SUMMARY OF THE INVENTION

The primary object of the invention consists in simply connecting the mounting housing and the wire frame in a sun visor of the aforementioned type, with resultant reduced operating steps and a simplified development of the mounting housing.

Another object of the invention is to connect the mounting housing of the sun visor with the reinforcing wire frame during formation of the mounting housing, and particularly to mold the mounting housing to the reinforcing frame.

To achieve these objects, according to the invention, the mounting housing is molded direclty on the reinforcing frame, and the region of the frame which is connected with the mounting housing is preferably encased or embedded completely within the mounting housing.

The mounting housing is comprised of moldable plastic. The frame is a thin and elongate strip, preferably a metal wire, and is bend approximately in the shape of a rectangular frame, and a mounting section is generally at one of the corner regions of the frame.

The invention simplifies and saves expense in the manufacture of the sun visor. This is considered surprising since it would not be expected that lengthening the cycle time for the injection molding of the mounting housing, which results from the required insertion of the wire frame into the injection mold, could result in decreased cost. However, the simplified shaping of the mounting housing according to the invention requires no receiving channels, undercuts, clip-on projections, or the like, in order to hold the wire frame since the housing is now cast directly on the wire frame. This is combined with the elimination of the need for stocking separately produced mounting housings, and is further combined with elimination of the subsequent assembling of wire frame and mounting housing. All of this reduces the cost of manufacture to a significant extent. In view of the fact that sun visors of the type in question are mass produced articles, even slight savings in cost may be essential with respect to the ability to compete.

In accordance with the invention, the ends of the strip or wire which forms the frame are preferably completely encased within the mounting housing. In this way, the ends of the wires are fastened to each other by the mounting housing, without requiring any welding, or the like. The reinforcing frame is in the form of a closed frame, e.g. a wire, and the frame has a separation along its length, creating two ends. In the mounting housing, the two ends of the frame are offset and pass each other, whereby when the mounting housing is formed over the ends of the frame, the two end regions of the frame help orient the mounting housing with respect to the frame.

It is advantageous for the regions at the ends of the wire of the frame to overlap and have offset ends which are inserted in the mounting housing as this provides increased resistance to being pulled out.

A U-shaped spring includes arms which are encased or embedded in the mounting housing. The spring is disposed in the mold along with the wire frame when the mounting housing is molded. More specifically, the ends of the arms of the spring are completely embedded in the mounting housing, while the upper portion of those arms, closer to the web of the spring, are only contacting the mounting housing on their interior facing sides, but are free of the mounting housing on their outward sides. The inward facing sides of the upper portions of the arms of the spring act on the support shaft of the sun visor for holding the sun visor body in every possible position of swing in all the sun visors mentioned at the start hereof. In known sun visors, the spring must be mounted in a step subsequent to formation of the mounting housings, in contradistinction to the present invention. Furthermore, springs which are used for known sun visors must have means for fastening them to the mounting housing. This makes their development more complicated and increases the cost of their manufacture. The spring of the invention can now have a relatively simple basic structure and need no longer be mounted subsequently.

The mounting housing is molded with a hole extending through the mounting housing and through the "U" of the spring adjacent the web of the spring, and the legs of the U-shaped spring are so placed and the hole through the mounting housing is so sized that when the mounting shaft for the sun visor is passed through the hole in the mounting housing, the upper portions of the arms of the spring press against the side of the mounting shaft and brake its movement and hold it in any selected orientation.

For helping to fasten the spring in the mounting housing, the spring arms have a hole through them, and the plastic material of the mounting housing extends through the hole, holding the spring to the mounting housing.

The method of the invention includes placing the portion of the reinforcing frame which is to be secured to the mounting housing in a mold cavity, wherein the cavity is of such size that the frame is away from the walls of the mold cavity, inserting the spring in the cavity over the reinforcing frame, preferably inserting a removable peg through the spring for eventually defining the hole through the mounting housing through which the mounting shaft of the sun visor will pass, and then injecting plastic material into the mold, for the reinforcing frame and the spring to be molded in the mounting housing.

Other objects and features of the invention will be described below with reference to the accompanying drawings.

BRIEF DESCRIPTION OF THE DRAWINGS

FIG. 1 shows a portion of a sun visor body in its mounting region;

FIG. 2 is a top view of the mounting housing of the visor body of FIG. 1;

FIG. 3 shows on a substantially larger scale a section along the line A—A of FIG. 1.

DESCRIPTION OF A PREFERRED EMBODIMENT

Figure 4:
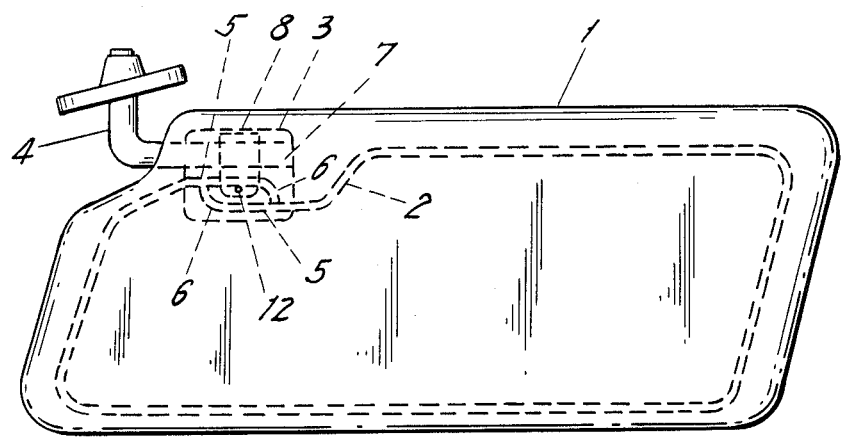
FIG. 4 shows the entire visor body of FIG. 1.

FIG. 1 shows a portion of a sun visor body 1 which has a reinforcing frame 2 formed of an elongate length of a reinforcing material of thin width, e.g. a wire embedded in it and a mounting housing 3 which receives a mounting shaft 4 by which the visor body is supported in the vehicle.

The reinforcing frame 2 has an approximately rectangular basic shape although only one of its rectangular corners is shown. The frame is embedded into the sun visor body 1 near the peripheral edge of the body. The reinforcing frame 2 is rigidly connected to the mounting housing 3, which comprises a plastic injection molding. The rigid connection between reinforcement frame 2 and mounting housing 3 is obtained, according to the invention, because the mounting housing 3 is molded directly onto the wire frame 2. The opposite end regions 5 of the bent wire which forms the frame 2 overlap each other and are developed with bent end pieces 6 that are preferably encased within the mounting housing 3. Receivers are provided in the mounting housing 3 for the regions of the wire of the reinforcment frame 2 which are to be arranged in the housing. These receivers are automatically formed by the injection molding of the housing around those regions of the wire. Therefore, upon injection molding of the mounting housing 3, attention need be paid merely to accurate development of the mounting hole 7 which receives the mounting shaft 4 and to maintaining outer contour radii of at least 3.2 mm. for the housing, below which radii one should not drop for safety of the visor in use.

A special feature of the invention is that the injection molding of the mounting housing 3 encases partial regions of the reinforcing frame 2 and also encases a torque spring 8 for braking the shaft 4. The spring 8 is a U-shaped leaf spring with sides 9 that extend down the sides of the housing 3. Each of the sides 9 has an inside surface which faces into the spring 8 and an opposite outside surface. A web 10 joins the sides 9. The web 10 has an outside surface which faces away from the mounting housing 3. At approximately their central regions, the sides 9 have an inward offset 11 so that the free end regions of the sides 9 are a shorter parallel distance from each other than the upper regions directly adjacent the web 10.

The free end regions of the sides 9 are completely embedded within the mounting housing 3. Holes 12 are provided in the free end regions 9 so that those regions are permeated by the plastic material. The rest of the spring 8 above the offsets 11 is free of plastic on the outside while its space between the sides 9 is filled with the plastic material of the mounting housing 3 only in the region between the sides 9 and the web 10, except that there is no filling at the mounting hole 7 for the mounting shaft 4.

The distance between the regions of the side arms of the spring adjacent the web 10 is smaller than the diameter of the mounting hole 7. Since the spring 8 does not have any outer abutment or covering in this region, the sides 9 can move outward elastically upon the insertion of the mounting shaft 4, and press on the shaft. The spring 8 act as a friction brake on the shaft and also secures the mounting shaft 4 against being pulled out of the mounting hole 7. To aid in this, the spring rests against the shoulders (not shown) on the mounting shaft which is formed by flats on the mounting shaft.

For the manufacture of the sun visor, a length of wire is first bent in a plane into the shape of an approximately rectangular frame. A region of this wire frame 2, preferably the region having the separated end sections, is inserted into the mold cavity of a plastic injection molding machine (not shown). The spring 8, which is a bent U-shaped strip of spring steel, is also inserted into the mold cavity and is held in a centered position by a peg 14 which is passed between the opposite sides of the mold and between the arms of the spring. The peg 14 also forms the mounting hole 7. After the mold cavity has been closed, the mounting housing 3 is injection-molded around the region of the frame present in the cavity and around the spring. The reinforcing frame 2, which is now supplemented by the mounting housing 3, is then provided with body padding in the customary manner for forming a completed sun visor body.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A method of fabricating a sun visor reinforcing frame and mounting housing combination, the method comprising: forming an elongate length of reinforcing material of thin width into a reinforcing frame;

disposing a region of the frame in an injection molding cavity, wherein the frame is that region is free of contact with the walls defining the mold cavity;

disposing a U-shaped spring in the cavity with the arms of the U of the spring straddling around at least part of the region of the frame in the cavity;

injecting a moldable plastic into the mold cavity for injection molding a mounting housing around the region of the frame and the spring in the cavity for defining an injection molded mounting housing.

2. The method of claim 1, further comprising, before the injecting of plastic into the mold, disposing a peg in the mold between the sides of the U-shaped spring toward the web of the spring for centering the spring in the mold cavity and for defining a hole through the mounting housing when it is molded.

3. The method of claim 2, further comprising removing the peg after the injection molding.

4. The method of claim 1, wherein the frame is formed into an approximately rectangular shape.

5. The method of claim 1, wherein the frame has separated end regions and is formed to a frame with end regions which extend past each other and it is those regions of the frame which extend past each other that are disposed in the mold cavity.

6. The method of claim 1, further comprising bending the sides of the spring down from the web of the U-shaped spring, so that end regions of the arms of the spring are out of contact with the walls of the mold cavity, while upper regions of the arms of the spring nearer the web are generally against the walls of the mold cavity, whereby the end regions of the arms of the spring are fully embedded in the plastic of the mounting housing while the outsides of the upper regions of the of the spring are not covered in the plastic of the mounting housing.

7. The method of claim 1, wherein the frame is in the form of a metal wire.

8. A method for fabricating a sun visor, comprising:
fabricating a reinforcing frame and mounting housing combination according to the method of claim 1 and thereafter forming a sun visor body over the frame and over the mounting housing.

* * * * *